March 13, 1951 L. C. STUKENBORG 2,545,318
PLANT CHOPPER HEAD
Filed March 22, 1946 2 Sheets-Sheet 1
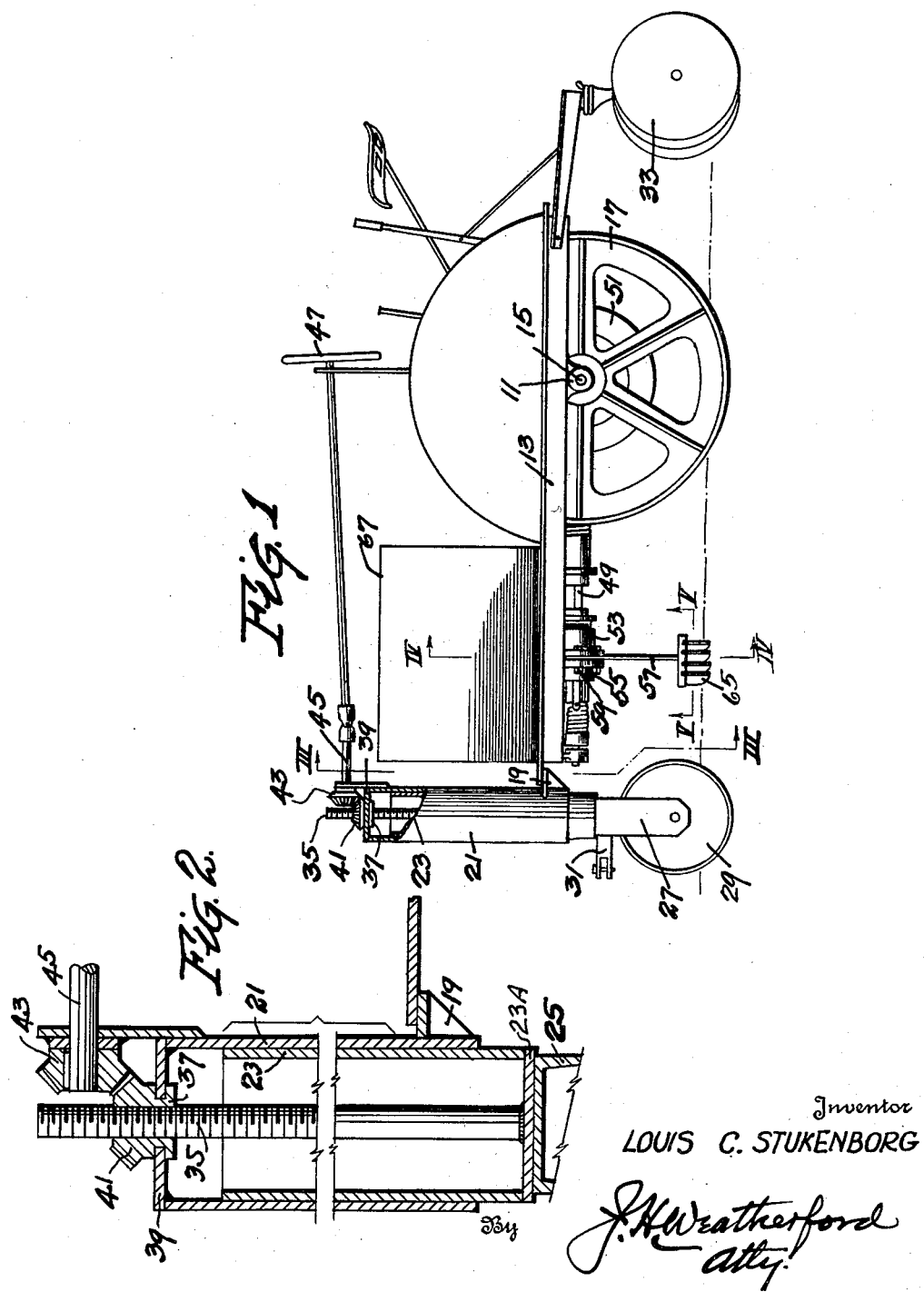
Inventor
LOUIS C. STUKENBORG
By J. H. Weatherford
Atty.

March 13, 1951  L. C. STUKENBORG  2,545,318
PLANT CHOPPER HEAD
Filed March 22, 1946  2 Sheets-Sheet 2
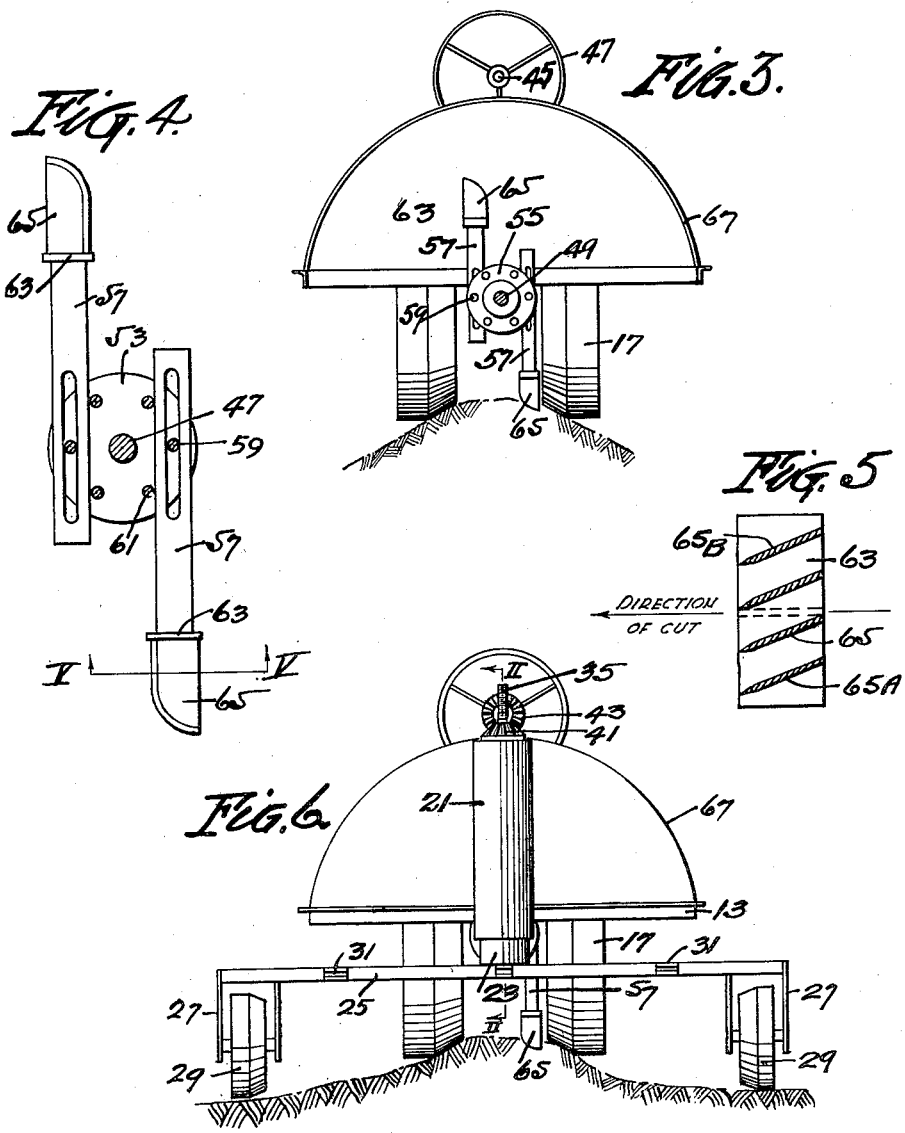
INVENTOR.
LOUIS C. STUKENBORG
BY Patented Mar. 13, 1951

2,545,318

UNITED STATES PATENT OFFICE 2,545,318

PLANT CHOPPER HEAD

Louis C. Stukenborg, Memphis, Tenn., assignor of one-half to Hobson Vandiver, Memphis, Tenn.

Application March 22, 1946, Serial No. 656,368

3 Claims. (Cl. 97—213)

This invention relates to improvements in chopper heads for farm implements, and has particular reference to improvements in choppers in which hoes or chopping blades are mounted and driven to cut transversely across the rows of plants.

The primary objects of the present invention are:

To improve the design and construction of cotton choppers;

To provide an improved form of chopping head;

To provide chopping heads and mounting means therefor of improved construction.

The means by which the foregoing and other objects are accomplished, and the manner of their accomplishment, will readily be understood from the following specification upon reference to the accompanying drawings, which show a traction drawn chopper:

Fig. 1 is a side elevation of a cotton chopper embodying my improved construction.

Fig. 2 is a sectional detail, on a larger scale, of the depth varying mechanism, taken on the line II—II of Fig. 6.

Fig. 3 is a sectional elevation on the line III—III of Fig. 1.

Fig. 4 is an enlarged sectional elevation, taken on the line IV—IV of Fig. 1, of the chopper arms and blades and the clamping hub therefor.

Fig. 5 is an inverted sectional plan taken on the line V—V of Figs. 1 and 4; and Fig. 6 is a front elevation of the machine.

Referring now to the drawings in which the various parts are indicated by numerals:

11 are brackets, carried by side frames 13, journalling a shaft 15 on which oppositely disposed wheels 17 are secured. The forward ends of the frames 13 are supported by a bracket 19 rigidly secured to a vertically disposed cylindrical sleeve 21. Turnably disposed in the sleeve 21 and vertically slidable with respect thereto, is a tubular cylindrical post 23 which rests on and is rigidly secured to a front wheel assembly which may include a transversely disposed frame member 25 from which brackets 27 depend, the brackets journalling the front wheels 29. 31 are traction hitches and 33 are cultivator discs.

Disposed within the post 23 and anchored with relation thereto, as by welding to the bottom 23A of the post, is a screw 35, which is threaded through a nut 37. The nut 37 is supported and journalled by a head 39 secured on the upper end of the barrel 21, and preferably is an integral part of a bevel gear 41. Meshing with the gear 41 is a gear 43 secured on a shaft 45, which is turned by a hand wheel 47 to raise or lower the sleeve 21 and the forward end of the chopper frame 13.

The wheels 17 drive a longitudinally disposed and suitably journalled shaft 49, in usual manner, as through a bevel gear 51 mounted on the wheel shaft 15 and a bevel pinion (not shown) on the shaft 49. The longitudinal shaft carries hub members 53 and 55 between which arms 57 are clamped by bolts 59 and 61. Each arm is slotted and one of the bolts 59 passed through the slot with one edge of the arm braced against two of the bolts 61 to compel turning of the arms by the hubs.

Each arm carries a head 63 at right angles to the arm and cutting blades 65 which project at right angles from the opposite side of the head, the blades being disposed at a minor angle with respect to the plane of the arm and the direction of cutting movement, so that the blades cut across the row with a scraping movement, the blade angle being such that the entire area of cut from the point of the blade 65A to the heel of the blade 65B is covered. Preferably the cutting heads and blades are covered during the upper half of their swing by a semi-cylindrical shield 67.

In operation, the arms 57 are adjusted to give the depth of cut desired and the bolts 59 and 61 are tightened to clamp the blades in such position.

The machine is drawn along the row of plants to be chopped and cultivated, the mounting of the post 23 within the sleeve 21 allowing the front wheel assembly to turn in response to pull of the traction means used on the frame member 25 and to accomplish such steering as may be necessary or desired, including turning at the ends of the rows. As the machine moves along the row, the wheels 17 through the gear 51 turn the longitudinal shaft 47 and swing the chopper heads and blades 65 transversely across the rows in usual manner making cuts at spaced intervals. The blades, due to their angular divergence with respect to the line of cut, turn and cultivate the ground to the full depth of cut and at the same time root out, rather than merely chop off, the plants and weeds in their path, the soil cultivated being shifted longitudinally in the row rather than removed laterally therefrom as in usual hoeing.

Should the depth of cut not be as desired, the operator of the machine may, by turning the hand wheel 47, through the shaft 45 and gears 43, 41, run the screw 35 up or down in the nut 37, raising or lowering the sleeve 21, and through the sleeve and the front end of the frame 13 carried thereby, concurrently raise or lower the blades 65 and the off barring discs 71 and shallow or deepen the cut, as the case may be.

In case the necessity for adjustment is local, as where the supporting front wheels in the furrows between the rows, encounter a pocket of wet and excessively soft ground, the blades may be raised and promptly lowered again after such pocket is passed.

It will be understood that the machine to which these improvements are attached is typical only and that the details of the improvement parts may be varied from without departing from the invention, and that except as such detail is specifically set out in any claim, it is not my intention to be limited thereby.

I claim:

1. In a chopper for a farm implement adapted for advancement along plant rows in cutting engagement therewith, and which includes a longitudinally disposed rotatable shaft having arms extending outward therefrom and chopper heads mounted on the outer ends of said arms; said chopper heads each comprising a base member disposed tangentially to, and substantially at right angles to, a plane of rotation of, and rigidly secured to the outer end of, a related said arm, and a plurality of parallel, equally spaced, flat blades rigidly secured to and extending at right angles outward from said base member, said blades being disposed at a minor angle to said plane, and being spaced apart substantially in the amount of their angular leads with respect to said plane, whereby under rotation of said shaft and arm carried heads they are adapted to cut into and longitudinally displace blade engaged portions of said rows.

2. A chopper for a farm implement which includes chopper heads in accordance with claim 1 in which the forward edges and outer ends of said blades are sharpened.

3. In a chopper for a farm implement adapted for advancement along plant rows in cutting engagement therewith, and which includes a longitudinally disposed rotatable shaft having a pair of arms extending oppositely outward therefrom and chopper heads each respectively mounted on the outer ends of said arm; said chopper heads each comprising equally spaced, parallel, knife-like blades rigidly secured to the outer end of said arm extending radially outward therefrom, said blades being disposed at a minor angle to a plane of rotation of said arm and being spaced apart substantially in the amount of their angular leads with respect to said plane, whereby they are adapted to cut into and longitudinally displace surface portions of said rows.

LOUIS C. STUKENBORG.

REFERENCES CITED

The following references are of record in the file of this patent:

UNITED STATES PATENTS

| Number | Name | Date |
|---|---|---|
| 111,023 | Welsh | Jan. 17, 1871 |
| 132,015 | Matthews | Oct. 8, 1872 |
| 615,175 | Hillerman et al. | Nov. 29, 1898 |
| 857,487 | Rivara | June 18, 1907 |
| 884,248 | White | Apr. 7, 1908 |
| 980,194 | Buckman | Jan. 3, 1911 |
| 1,091,258 | Vaughan | Mar. 24, 1914 |
| 1,102,362 | Stone | July 7, 1914 |
| 1,120,371 | Bruner | Dec. 8, 1914 |
| 1,123,699 | Crum | Jan. 5, 1915 |
| 1,205,830 | Wilkins | Nov. 21, 1916 |
| 1,266,439 | Fanger | May 14, 1918 |
| 1,594,789 | May et al. | Aug. 3, 1926 |
| 2,025,257 | Vaughn et al. | Dec. 24, 1935 |
| 2,424,460 | Hettelsater | July 22, 1947 |